United States Patent
Chuang

(10) Patent No.: US 6,592,263 B2
(45) Date of Patent: Jul. 15, 2003

(54) EFFICIENT BEARING

(76) Inventor: Wen-Hao Chuang, Kung-Yeh 2nd Rd., No. 150, Lane 250, Lin-Yuan Hsiang Kaohsiung, Hsien (TW)

( * ) Notice: Subject to any disclaimer, the term of this patent is extended or adjusted under 35 U.S.C. 154(b) by 0 days.

(21) Appl. No.: 10/006,114

(22) Filed: Dec. 10, 2001

(65) Prior Publication Data

US 2003/0108260 A1 Jun. 12, 2003

(51) Int. Cl.$^7$ .............................................. F16C 17/10

(52) U.S. Cl. ...................... 384/125; 384/245; 384/276

(58) Field of Search ................................. 384/125, 245, 384/276, 297, 244

(56) References Cited

U.S. PATENT DOCUMENTS

| | | | | |
|---|---|---|---|---|
| 3,052,504 A | * | 9/1962 | Wind | 384/245 |
| 4,955,731 A | * | 9/1990 | Yamamura | 384/245 |
| 5,609,421 A | * | 3/1997 | Schulze-Eyssing et al. | 384/125 |

\* cited by examiner

*Primary Examiner*—Lenard A. Footland
(74) *Attorney, Agent, or Firm*—Birch, Stewart, Kolasch & Birch, LLP

(57) ABSTRACT

An efficient bearing includes jutting anchor flanges directly extending from a front end of the bearing for coupling with an air fan spindle housed in the bearing. The air fan spindle thus may have a precise axis and less floating or sinking during rotation to achieve better balance. The bearing barrel further has a plurality of plane surfaces formed on the exterior peripheral surface to couple with the air fan seat securely to increase air fan rotation efficiency.

2 Claims, 3 Drawing Sheets

EFFICIENT BEARING

FIELD OF THE INVENTION

The present invention relates to an efficient bearing and particularly an efficient bearing with an anchoring means to facilitate precise positioning and achieve more efficient air fan rotation.

BACKGROUND OF THE INVENTION

Conventional air fans for radiators generally consist of a bearing, a bushing, washers and C-type clip washers. They usually take a relative long time to assemble. Hence the labor and material costs are high and result in lower competitiveness.

Moreover, during air fan operation, the blades will be floated or sunk due to different air flow directions. To anchor the air fan spindle merely by the C-type clip washers can only alleviate the spindle floating or sinking phenomenon but cannot anchor the spindle to a desired position. The vibration incurred during air fan rotation might even shake loose the C-type clip washers. Furthermore, the axis positioning of the air fan during operation directly affects air fan service life and operating efficiency, and also affects the noise level. Thus far, little improvement has been made on the air fan in these areas. As a result, the progress of the air fan is falling behind CPU development, and cannot provide effective heat dissipating efficiency.

SUMMARY OF THE INVENTION

In view of the foregoing disadvantages, the primary object of the invention is to provide an improved bearing structure for enhancing air fan heat dissipating efficiency.

The bearing according to the invention includes jutting anchor flanges directly formed on the front end of the bearing to couple with anchor groove formed on the air fan spindle so that the air fan spindle may be run through the bearing and anchored to a desired position thereby to limit the floating or sinking of the air fan spindle. As the bearing and the jutting anchor flanges are integrally formed, component numbers and assembly processes can be reduced to lower the cost.

The invention has the following features and advantages:

1. At the bottom of the air fan seat, there is an anchor block which has an indented trough matching an arched top end of the air fan spindle to support the air fan. With the aid of the anchor flanges for positioning at the lower end, the air fan spindle has anchoring positions at the upper and lower ends to make rotation axis more precise and thus enhance air fan balance.

2. The bearing of the invention has a plurality of plane surfaces formed on the exterior peripheral surface to allow the bearing having expansion allowance after installation so that the bearing may be coupled more tightly and securely to achieve more precise alignment of the bearing axis.

The foregoing, as well as additional objects, features and advantages of the invention will be more readily apparent from the following detailed description, which proceeds with reference to the accompanying drawings.

DESCRIPTION OF THE PREFERRED EMBODIMENT

Figure 1:
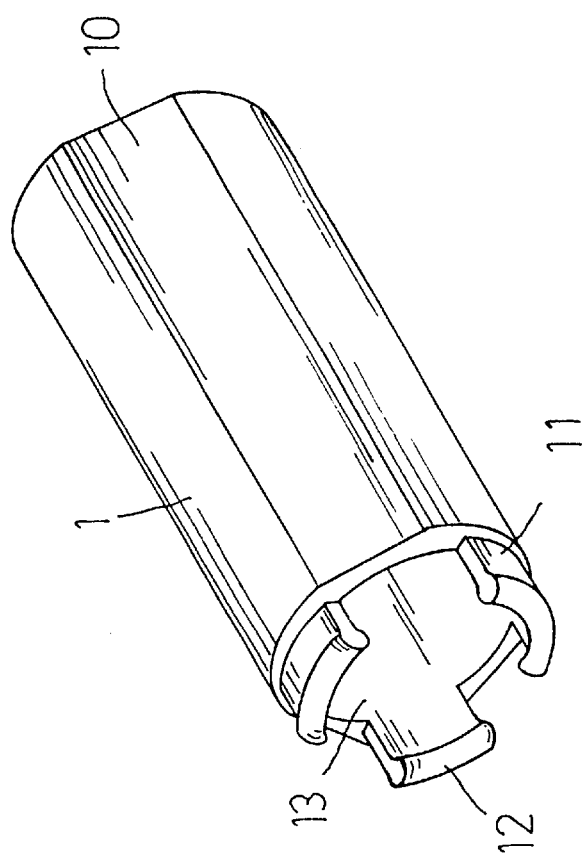
FIG. 1 is a perspective view of a bearing body of the invention.

Referring to FIG. 1, the invention includes a bearing body 1 which has a plurality of plane surfaces 10 formed on the exterior peripheral surface, and a plurality of jutting anchor flanges 11 directly extending from a front end thereof. Each anchor flange 11 has a front end formed a bulged rim 12 and a rear edge co-plane with the inner end surface 13 of the bearing.

Figure 2:
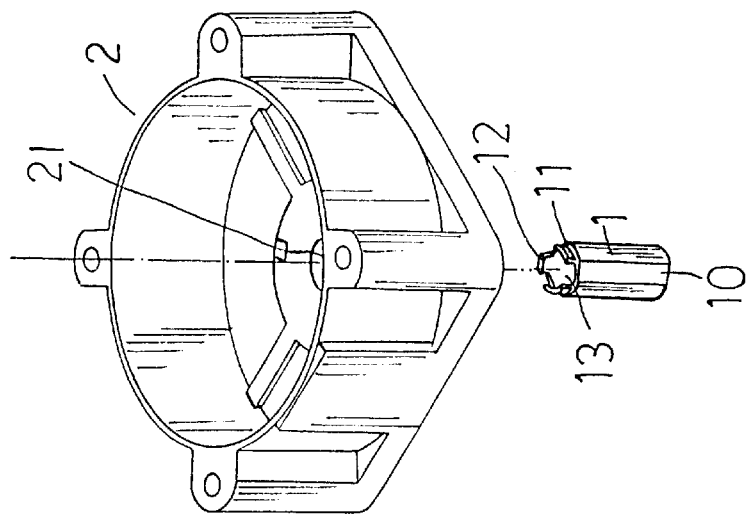
FIG. 2 is an exploded view of the invention for assembly.

Referring to. FIG. 2, when to assemble, the bearing body 1 is coupled in a bearing bushing 21 of the motor coil 20 of a radiator air fan seat 2 from the bottom end to an upper end. The air fan seat has a bottom end opening 22 which is engaged with and sealed by an anchor block 23. The anchor block 23 has an indented anchor trough 230 formed on the top side thereof to match an arched top end 30 of the spindle 3 of the air fan.

Figure 4:
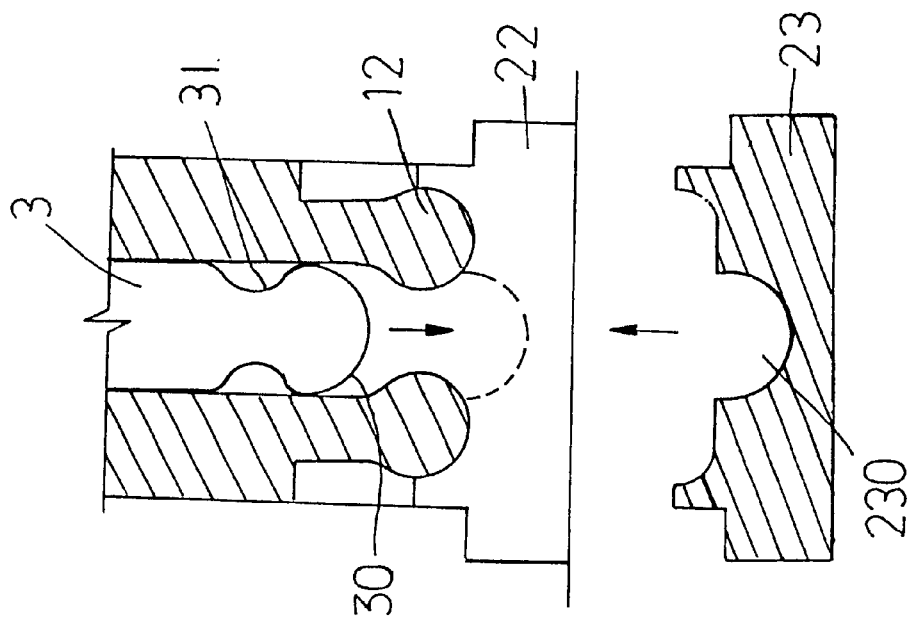
FIG. 4 is a fragmentary sectional view of the invention during assembly.
Figure 3:
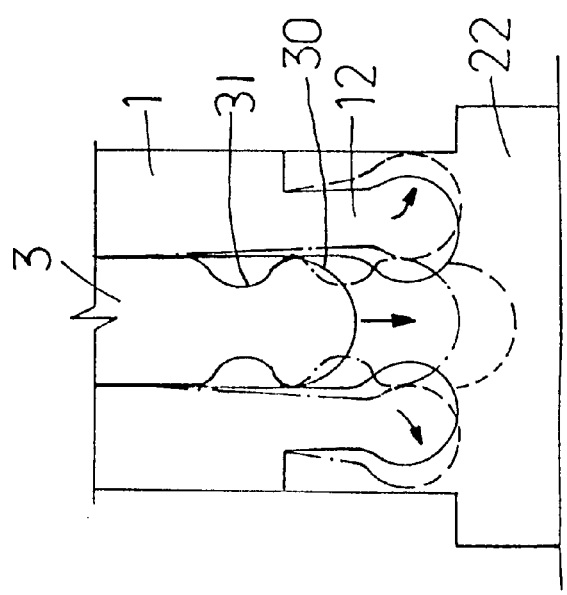
FIG. 3 is a fragmentary schematic view of the invention during assembly.
Figure 5:
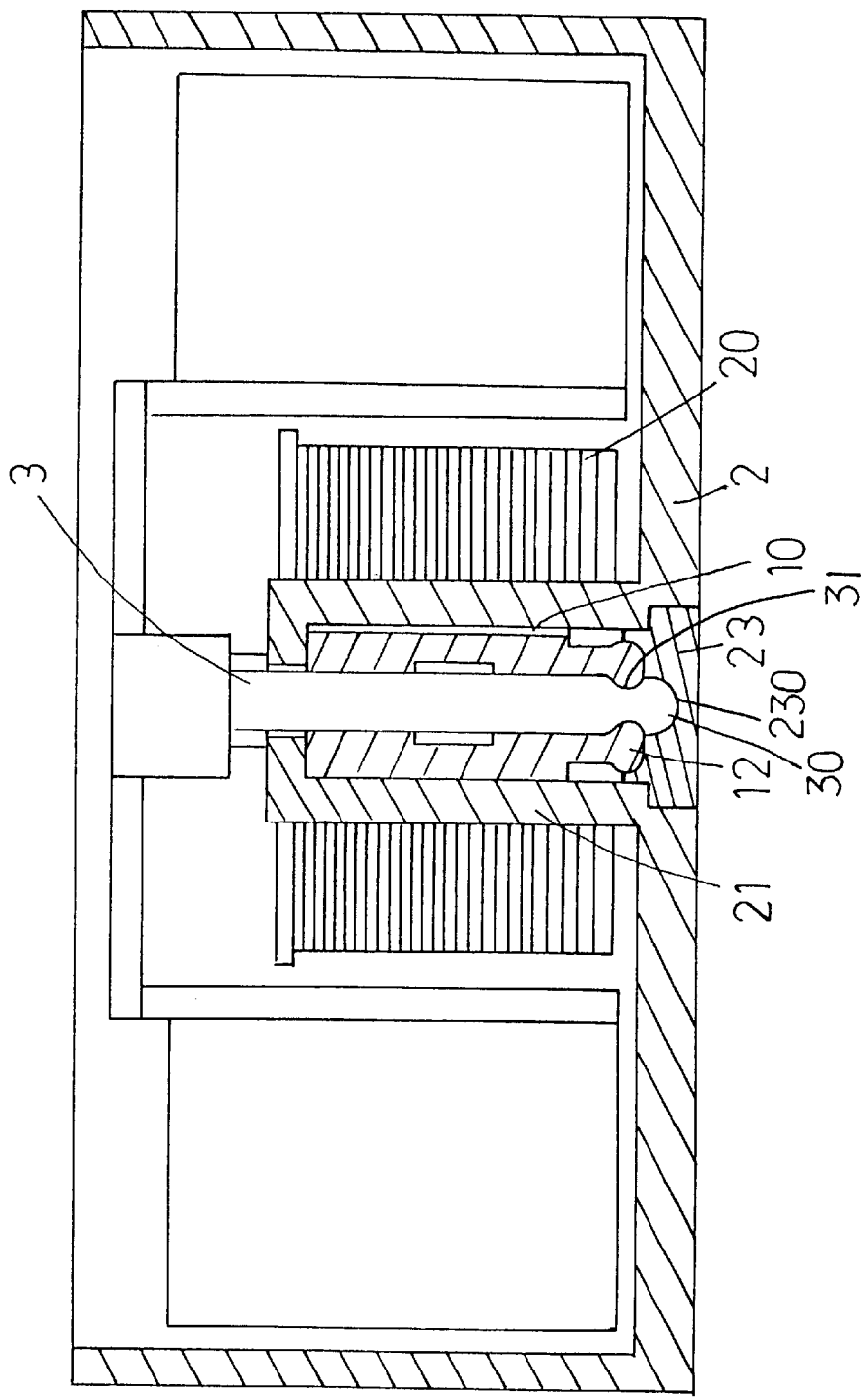
FIG. 5 is a sectional view of the invention after assembled.

Referring to FIGS. 3 and 4, after the bearing body 1 is housed in the bearing bushing 21, the air fan spindle 3 may be inserted into the bearing body 1 with the arched top end 30 pushing the anchor flanges 11 outwards. Then the anchor flange 11 will be bounced back to clip an indented groove 31 of the spindle 3 to form an anchoring position. Then the anchor block 23 may be fastened to and seal the bottom end opening 22 of the air fan seat 2 with the indented anchor trough 230 matching and supporting the spindle 3 to complete the assembly (as shown in FIG. 5).

What is claimed is:

1. A bearing comprising a barrel shaped hollow bearing body which has a plurality of plane surfaces formed on the exterior peripheral surface thereof, and jutting anchor flanges directly extending from a front end the bearing body; the bearing body being housed in an air fan seat for holding an air fan spindle, an air fan spindle having an indented groove formed on a front section thereof to couple with the jutting anchor flanges for anchoring the spindle, and an arched front end to match and rest on an anchor trough formed on an anchor block of the air fan seat.

2. The efficient bearing of claim 1, wherein the jutting anchor flanges are detachable from the bearing body.

* * * * *